Figure 3:
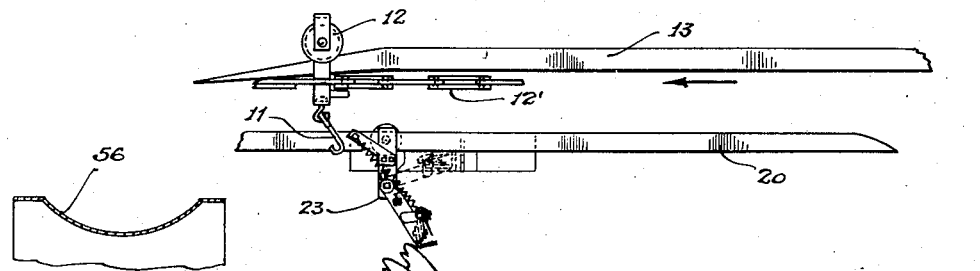

July 15, 1947. L. B. DUFF 2,423,930
CUT-DOWN DEVICE
Filed June 22, 1945 2 Sheets-Sheet 1
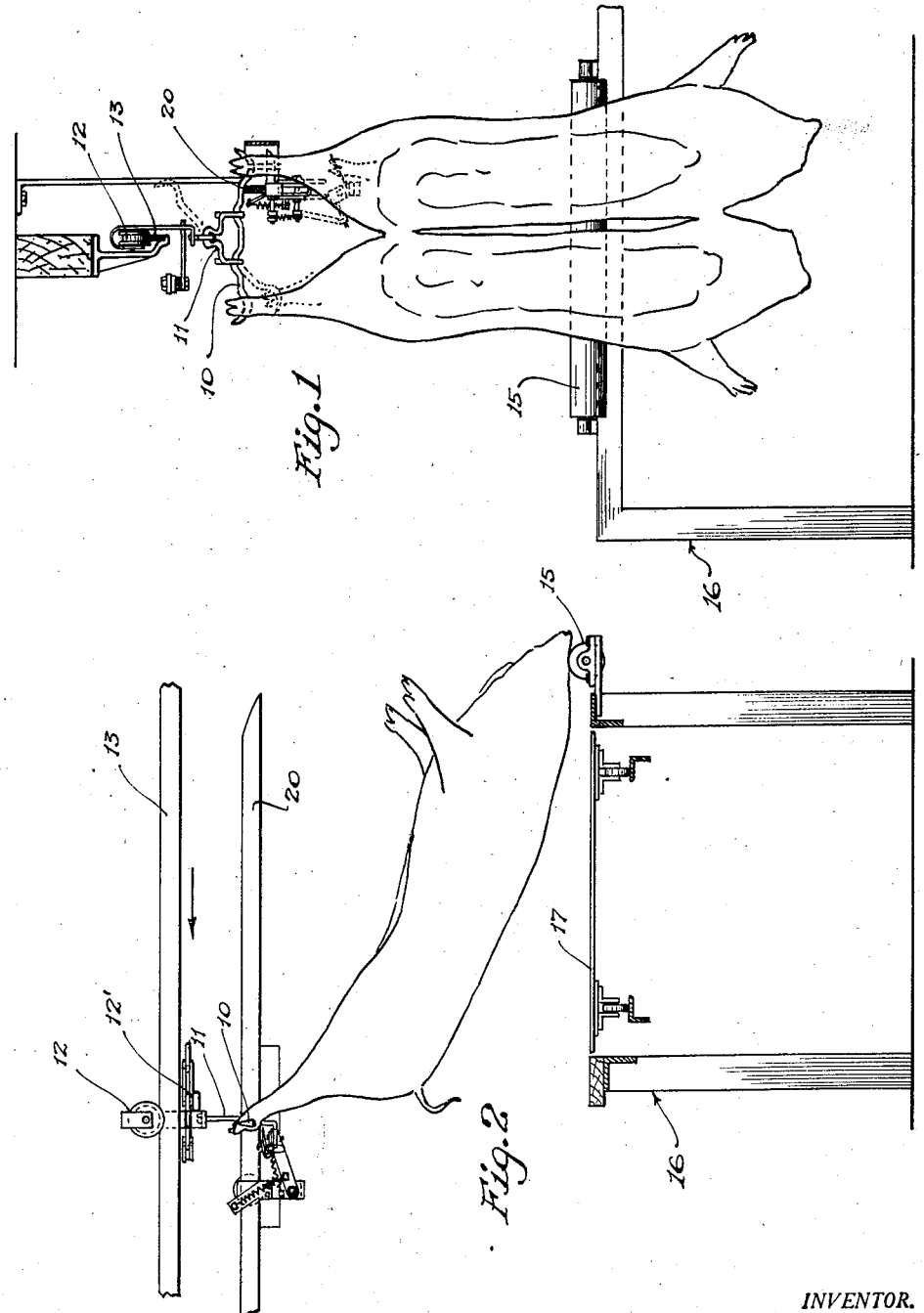
INVENTOR.
Lloyd Berten Duff
BY
R. G. Story
Attorney July 15, 1947.    L. B. DUFF    2,423,930
CUT-DOWN DEVICE
Filed June 22, 1945    2 Sheets-Sheet 2

INVENTOR.
Lloyd Berten Duff
BY
R. G. Story
Attorney

Patented July 15, 1947

2,423,930

UNITED STATES PATENT OFFICE 2,423,930

CUT-DOWN DEVICE

Lloyd Berten Duff, Milwaukee, Wis., assignor to Industrial Patents Corporation, Chicago, Ill., a corporation of Delaware Application June 22, 1945, Serial No. 601,001

7 Claims. (Cl. 17—24)

This invention relates to a mechanism adapted for use during the butchering of animals and more particularly to an automatic means for cutting hog carcasses down from a conveyor system.

It is an object of this invention to provide an automatic means for severing the gam cords of hog carcasses to cause them to drop down from the conveyor system while simultaneously effecting removal of the supporting gambrels from which the carcasses hang.

It is another object of this invention to provide a removable and adjustable gam cord cutting device.

Another object of the invention is to provide an improved cutting means for severing the gam cord.

Other objects will appear from the specification below.

Figure 5:
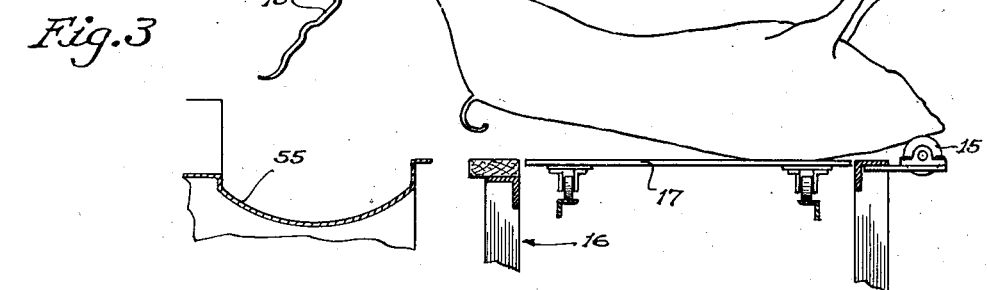
Figure 4:
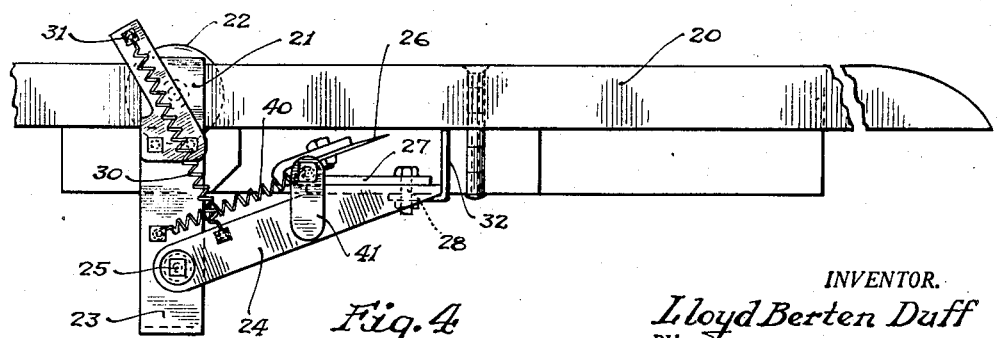

In the drawings:

Figure 1 is an end elevation showing the relation of the gam cord cutting means to the carcass of a hog being transported along the conveyor system with the carcass about to engage a landing table, Figure 2 is a side elevation of the mechanism shown in Figure 1, showing one leg of a hog's carcass about to engage the gam cord severing or cut down knife, Figure 3 is a side elevation of the mechanism shown in Figure 1, showing the relative positions of the cut down knife and carcass an instant after the gam cord has been severed and the legs of the carcass have been released from the gambrel, Figure 4 is a detailed side elevation of the knife structure, and Figure 5 is a plan view of the structure of Figure 4.

After the killing of certain animals, such as hogs, and during a portion of the butchering process, it is the usual practice to suspend the carcass from a trolley moving along a trolley rail. The carcass is conveyed in suspended position past various preliminary stations by such means while certain required work is done upon the carcass, and upon completion of this initial butchering work, the carcass is laid flat upon a landing table. A conveyor structure cooperates with the landing table, and after the carcass has been laid on the table, it is carried forwardly past various other butchering stations where dissection of the carcass is completed.

During movement along the trolley rail, the carcass is usually suspended from a conveyor trolley by being hung from a gambrel engaged under the gam cords of the rear legs of the carcass. The gambrel usually takes the form of a stiff bar with suitable gam cord engaging hooks formed on the ends thereof to engage and support the carcass. The gambrel is preferably provided with a bearing means designed to cooperate with a trolley which in turn is adapted to ride along a suitable rail suspended from the ceiling and the gambrel may be removably carried by the trolley so that it can be easily separated therefrom.

After the preliminary butchering operations have been effected, the carcass is lowered from the trolley and separated from the gambrel so that it may be laid on the landing table and in the past this has usually been done by manually severing one or both of the gam cords so that the carcass falls and the gambrel is released from engagement under the gam cords of the rear legs of the carcasses.

In lieu of the hand cutting of the gam cords, it has previously been proposed to use stationary cutting knives fixedly mounted in proper position with respect to the landing table to engage and sever the gam cords of carcasses as they are delivered along with the trolley. These devices have not been universally adopted, however, although they have been offered to the trade for many years. The present invention is an improvement upon this prior art type of gam cord severing means whereby a completely operative device is provided that may be adapted to all conditions.

In addition to functioning as a gam cord severing device the herein disclosed means is also operative to accomplish the detaching of the gambrel from the rear legs of the carcass and its separation from the trolley for delivery to a collection chute for reuse. The invention is shown as having particular utility in association with the landing table position of the production line operation; however, it will be understood that the device has more general application and may be used wherever it is desired to cut down a carcass hung by its gam cords from a trolley.

The invention preferably takes the form of a movably mounted knife blade which is disposed with respect to the conveyor system such that it will normally engage and wipe against the gam cord of one leg of a carcass moving along the line. The engagement is, of course, adjusted to be of such degree as to sever the cord and the movement of the knife is controlled relative to that of the gam cord to obtain proper placement and pressure of the knife against the cord. The severing of the gam cord in one leg will release one end of the supporting gambrel from engagement with that leg whereupon the gambrel supporting system becomes unbalanced. The unbalanced gambrel then pivots around its supporting means and as the carcass drops, the gambrel is twisted free from the other leg of the carcass.

The movable mounting of the knife structure permits the severing action to be accomplished by drawing the gam cord over the knife blade. A further feature of the movable mounting resides in the provision of a structure whereby the knife drops with the leg after the gam cord is severed and is released from the gambrel. The knife swings down with the falling leg until it is disengaged from the leg as the carcass falls onto the landing table.

The preferred form of the knife structure as shown in the drawings and the relative position of the knife with respect to the conveyor system is best seen in Figures 1, 2, and 3. Referring to Figure 1, the carcass of an animal, such as a hog, is represented as being hung from its rear legs on a gambrel 10, the gambrel being carried in a hook 11 supported from a trolley 12. The trolley rides on an overhead rail 13 and the carcass hangs with the head pointing downwardly from the gambrel while passing through the preliminary treatment steps.

As shown in Figure 2 the carcass may be moved along the trolley rail until the back of the carcass is engaged against the roller 15 of the landing table 16 and, upon being tripped by the roller, the carcass falls over the table to land on conveyor 17. The rear legs of the carcass, however, are carried along with the trolley 12 which is driven from the power belt 12' so that the rear legs are carried toward the knife structure forming the subject matter of this invention. The forward motion of the trolley is continued to drive the gam cord of one of the legs against the knife to sever the gam cord whereby that leg is released from engagement with the gambrel and the carcass may fall onto the landing table, as shown in Figure 3.

The gambrel is disengaged from the other leg of the carcass by the falling motion of the carcass and when the latter comes to rest on the conveyor 17, it is moved from under the trolley system to be carried past the remaining butchering stations.

The knife structure itself, for engaging and then severing the gam cord of the one leg is shown more in detail in Figures 4 and 5. The knife assembly is removably affixed to a guide rail 20 by means of an inverted U-shaped member 21 that may be hooked over the guide rail 20 and clamped thereto by means of the hand screw 22. It is seen that with this mounting structure, the knife assembly may be adjusted longitudinally along the guide rail, quickly removed, or replaced as will appear more fully below.

The supporting frame 21 has a downwardly extending interfitting U-shaped bearing support 23 fixed thereto upon which the vertically swinging lever 24 is pivotally mounted on bearing 25. A knife blade 26 is carried by a bracket 27 mounted to have a generally horizontal swinging movement on the end of the vertically swinging lever, as best shown in Figure 5. The bracket 27 is mounted on the end of the arm 24 to swing about bearing 28 and is shaped to present knife 26 at approximately the angle with respect to guide rail 20 that is shown in Figure 4. The bracket 27 is rotatable about the bearing 28 to permit the knife to swing from the full line position shown in Figure 5 through the dotted line position.

The arm 24, upon which the knife is mounted, is normally biased to rotate in a counterclockwise direction by a spring 30 connected between the vertically swinging arm and the post 31 and a stop 32 is fixed to the tip of arm 24 to engage against the underside of guide rail 20 to limit the upward swing of arm 24 under tension of spring 30. A second spring 40 is connected between horizontally swinging bracket 27 and fixed bearing support 23 to resiliently urge the knife from the dotted line position toward the full line position shown in Figure 5. A suitable stop 41 may be provided to set the knife in its fully projected position, i. e., disposed generally at right angles to arm 24, as shown in the plan view of Figure 5.

The U-shaped supporting member 21 of the knife mounting may have a by-passing guide surface fixed thereto which includes the generally rectangular shaped member made up of walls 50 and 51 which substantially surround the hand screw 22 and knife blade 26. A by-pass gate 52 is hingedly mounted on the free end of wall 51, as best shown in Figure 5, and the gate 52 may be swung to the dotted line position there illustrated, to direct the legs of hog carcasses around the knife if desired, without their coming in contact with the knife. The gate 52 is provided with a cam surface 53 which is outwardly turned so as to be engaged by a leg being by-passed around the gate so that the gate is opened automatically as each leg rides over the cam. If the operator wishes to by-pass succeeding carcasses passing along the trolley system, it will be necessary to reset the gate 52 before each succeeding carcass to be by-passed reaches the cut down device.

The above-described mechanism automatically cuts hog carcases down from a trolley conveyor system and when the carcass moving along the conveyor approaches the landing table, one side of the gambrel is engaged at the end thereof, on the guide rail 20. The gambrel is driven along the top of the guide rail by the power belt 12' which drives the trolley 12 and the gambrel carries the leg engaged thereby into the knife blade 26. The forward movement of the trolley drives the gam cord against the resiliently projected knife blade and the forward movement of the leg coupled with the swinging movement of the knife, as it begins to turn about the bearing 27, first disposes or adjusts the knife to proper cutting position and then performs the cutting of the gam cord with a relatively long sweeping motion of the gam cord against the edge of the cutting blade.

As soon as the gam cord is severed, the weight of the carcass strips that leg from the end of the gambrel upon which it was engaged and the released leg and that half of the carcass begins to drop toward the landing table from about the position shown in Figure 2. As the one leg drops, it carries the knife blade engaged thereby with it and the blade mounted on the vertically swinging arm 24 is carried downwardly with the falling carcass. The knife follows the falling carcass until it becomes disengaged therefrom, whereupon the springs 30 and 40 cause arm 24 to swing upwardly and the blade 26 to be projected to the full line position shown in Figure 5.

Simultaneously with the dropping of the first leg upon release from the gambrel, the unbalanced gambrel pivots about hook 11 and the other leg of the carcass begins to drop. The motion of the falling carcass drives the gambrel from its normally horizontal position through the dotted line position shown in Figure 1 so that the other end of the gambrel engaged in said other leg, is twisted loose from its engagement with the gam cord of that leg. The falling motion of the carcass causes the gambrel to become completely disengaged from this leg of the carcass and the gambrel 10 upon being released from the leg, is flipped into the collecting chute 55, as shown in Figure 3 by the motion imparted to it by the falling carcass. The trolley may then be run off of the end of the conveyor rail 13 to fall into a suitable collecting means as chute 56.

The above described movable and resilient mounting of the knife blade permits a slight adjustment of the positioning of the knife against the gam cord upon primary engagement and, thus, it has been noted that the knife adjusts itself somewhat longitudinally along the gam cord to engage it just below the gambrel hook where the cord is drawn to a taut condition. The severing of the gam cord is more expeditiously accomplished because of this and due to the relatively long stroke provided for effecting severance of the gam cord, longer wear of the knife results. A further feature inherent in this structure resides in that the downward swinging motion of the knife in following the falling leg after completion of severance of the gam cord prevents the bone of the leg being scraped against the knife edge thus further tending to minimize wear.

The adjustable mounting for the knife on guide rail 20 makes it possible to place the knife in the most desirable position for working on carcasses of various sizes and, furthermore, makes the structure readily releasable so that should the knife become dull, a new unit may be quickly slipped into place while removing the dull knife for sharpening.

The above description covers the preferred form of the device and one mode of its application. It is apparent that two knives could be used to simultaneously engage the gam cords of both of the legs hung from the gambrel, and additional means would then normally be provided to separate the gambrel from the trolley in returning it to the starting point of the conveyor. It is probable that many obvious modifications of the mechanism described herein will occur to those skilled in the art, all of which are contemplated to fall within the scope of the following claims.

I claim:

1. A device for cutting a carcass down from a conveyor trolley moving along a supporting rail, said carcass being carried on the trolley by a removably mounted gambrel, comprising a knife positioned to engage and sever the gam cord on one of the legs of the carcass as the leg is driven into the knife by movement of the carcass along said rail, and a movable mounting for said knife whereby it is held projected to engage against the gam cord of the said one of the legs to sever the gam cord as the carcass progresses along the rail, and said knife being adapted to move downwardly with the leg after the gam cord is severed and said movement continuing until the leg becomes disengaged from the knife.

2. A device for removing a carcass from a conveyor system including a rail and trolley for moving along the rail, the carcass being hung from a gambrel engaged behind the gam cords of the rear legs of the carcass, said gambrel and the carcass hanging therefrom normally being balanced on a hook supported from said trolley comprising; a knife positioned along the path of travel of one of the rear legs of said carcass; said knife being movably mounted; said knife being shaped to engage, and mounted to turn with the leg while the gam cord of said one leg of the carcass is drawn across the knife to be severed thereby whereupon the leg is released from the gambrel and the carcass falls downwardly.

3. A device for removing the carcass of a hog from a conveyor system including a rail and trolley for moving along the rail, the carcass being hung from a gambrel engaged behind the gam cords of the rear legs of the carcass, said gambrel and the carcass hanging therefrom normally being balanced on a hook supported from said trolley during travel along the rail comprising; a knife positioned along the path of travel of one of the rear legs of said carcass; said knife being resiliently and movably mounted; said knife being shaped to engage, and mounted to turn with the leg while the gam cord of said one leg of the carcass is drawn across the knife to be severed thereby whereupon the leg is released from the gambrel and the carcass falls downwardly.

4. A device for removing a carcass of a hog from a conveyor system including a rail and trolley for moving along the rail, the carcass being hung from a gambrel engaged behind the gam cords of the rear legs of the carcass, said gambrel and the carcass hanging therefrom normally being balanced on a hook supported from said trolley comprising; a knife positioned along the path of travel of one of the rear legs of said carcass; said knife being pivotally mounted with respect to said leg and rail; resilient means to normally urge said knife to a projected position; said knife being shaped to engage, and mounted to turn with the leg while the gam cord of said one leg of the carcass is drawn across the knife to be severed thereby whereupon the leg is released from the gambrel and the carcass falls downwardly.

5. A device for removing a carcass from a conveyor system including a rail and trolley for moving along the rail, the carcass being hung from a gambrel engaged behind the gam cords of the rear legs of the carcass, said gambrel and the carcass hanging therefrom normally being balanced on a hook supported from said trolley comprising; a knife positioned along the path of travel of one of the rear legs of said carcass; said knife being pivotally mounted to move in two directions with respect to said leg and rail; said knife being shaped to engage and mounted to turn with the leg while the gam cord of said one leg of the carcass is drawn across the knife to be severed thereby whereupon the leg is released from the gambrel and the carcass falls downwardly.

6. A device for removing a carcass of a hog from a conveyor system including a rail and trolley for moving along the rail, the carcass being hung from a gambrel engaged behind the gam cords of the rear legs of the carcass, said gambrel and the carcass hanging therefrom normally being balanced on a hook supported from said trolley comprising; a knife positioned along the path of travel of one of the rear legs of said carcass; said knife being pivotally mounted to move in two directions with respect to said leg and rail; resilient means to normally urge said knife to a projected position; said knife being shaped to engage and mounted to turn with the leg while the gam cord of said one leg of the carcass is drawn across the knife to be severed thereby whereupon the leg is released from the gambrel and the carcass falls downwardly.

7. An attachment for cooperating with a landing table and adapted to be mounted over the table and upon a trolley rail for removing the carcass of a hog from a conveyor system passing over the table, said system including a rail and trolley for moving along the rail, the carcass being hung from a gambrel engaged behind the gam cords of the rear legs of the carcass, said gambrel and the carcass hanging therefrom normally being balanced on a hook supported from said trolley during travel along the rail comprising; a frame having a configuration adapted to fit over said rail; a knife positioned along the path of travel of one of the rear legs of said carcass; said knife being movably mounted on said frame with respect to said leg and rail; said knife being shaped to engage and mounted to turn with the leg while the gam cord of said one leg of the carcass is drawn across the knife to be severed thereby whereupon the leg is released from the gambrel and one side of the carcass drops toward the table and, after one side of the gambrel is released from the carcass, the weight of the carcass is thrown on the other end of the gambrel such that the gambrel becomes unbalanced and pivots about the hook of the trolley to be twisted free from behind the gam cord of the other leg as the carcass continues to fall downwardly to be deposited on the landing table.

LLOYD BERTEN DUFF.